United States Patent Office 3,114,639
Patented Dec. 17, 1963

3,114,639
METHOD FOR PREPARING EXTRUDED
FOOD PRODUCTS
Eugene J. Rivoche, Washington, D.C., assignor to Rivark Research and Development Corporation, a corporation of Indiana
No Drawing. Filed Mar. 28, 1960, Ser. No. 17,742
3 Claims. (Cl. 99—100)

This invention relates to a new method for preparation of food products by an extrusion process. More specifically, it refers to the preparation of extruded products of the same type which after extrusion have to be cooked, as for example, chip-type products which are cooked in deep fat. The products now on the market are usually prepared from starchy materials, and during the process of preparation the starch is transformed into a gel which holds the mass together sufficiently firmly to resist frying in deep fat, cooking in boiling water, or over steam. The preparation of these products usually requires a batch-type of production which is not suitable for conversion to continuous operation. The special treatment which is required for transformation of water-starch mixes to a strong gel-type mass suitable for extrusion requires application of either chemicals or extensive heat, or both, in a manner best suited for batch operation. The completion of the operation requires time, and each batch must be carefully adjusted prior to extrusion to facilitate the extrusion and to attempt to obtain product uniformity.

To prepare a solid mass suitable for extrusion usually requires a high concentration of starchy product (about 70% dry and 30% water), with even higher concentration of starch required for a heavier product. The conventional process practically excludes the possibility of preparation of products from mixtures containing a low concentration of dry elements and also excludes those materials which do not possess the inherent characteristics to form gels or strong adherences between the particles. Such materials cannot be extruded and cooked and cannot withstand the flash action of cooking in deep fat. For this reason, a very large variety of food materials is excluded from the chip market by the difficulties encountered in extrusion. It is substantially impossible, for example, to make fruit or vegetable chips or noodle-line products, fish or meat-poultry chips, or chips employing a combination of such foods by conventional methods.

It is even more difficult to prepare extruded types of products from fresh food materials which desirably might be packaged for sale uncooked to remain uncooked until ready to serve. In other words, sometimes it is desirable to market an extruded fresh product for cooking immediately before eating instead of a product that has already been cooked in the process of its preparation.

A food mixture is ready to be extruded only if it is sufficiently viscous—not too sticky and by preference slippery. Further, the extruded products must be able to retain the desired extruded shape and have to be strong enough to resist the flash action of deep-fat frying or boiling in water. This requires production of a relatively firm product with a rather high concentration of dry elements, and as explained above is mostly limited to the use of materials which have gel-forming characteristics. These conditions result in the possibility of preparation of a group of products of a very small variety having minor differences in taste and appearance.

The primary object of the present invention is to provide a process which overcomes substantially all of the above-mentioned handicaps.

A further object of the invention is to provide a method for preparing food products suitable for extrusion while permitting full control of the moisture content of the products.

Another object of the invention is to provide a method for preparing extruded-types of products from any desired food materials, or combinations of food products.

Another object of the invention is to provide an extrusion process wherein the food materials do not require prolonged chemical or heat treatment prior to extrusion.

Another object of the invention is to provide an extrusion method which is adapted for continuous operation.

The present invention comprises mixing the desired food particles with a methyl cellulose solution to provide a viscous, slippery, extrudable mass, extruding such mass through a restricted orifice to form thin ribbon or string-like pieces and introducing these pieces directly into a cooking bath such as deep-fat, boiling water, or the like, or into a freezing or drying chamber for preservation for subsequent cooking.

In my prior U.S. Patents Nos. 2,798,814 and 2,887,382, it was disclosed that relatively thin, shaped pieces of food products comprising food particles of all kinds mixed with methyl cellulose solution could be prepared by either freezing or heating the mixture in a mold, followed by slicing the molded material. The slicing operation was performed either upon frozen pieces or upon pieces which had been heated to convert the methyl cellulose solution to gel or film form. Food patties can be readily produced in such manner. However, the molded masses, whether frozen or heated, are too brittle for the ready production of thin, chip-like, shoe string, or ribbon-type products which, for example, require thicknesses of $\frac{1}{8}$ to $\frac{1}{16}''$ or less. The present invention eliminates the molding, freezing or heating, and slicing operations and permits chips of any desired thickness to be produced directly. In accordance with the invention, the methyl cellulose solution provides a lubricating function facilitating the extrusion operation as well as providing a means for holding the food particles together and facilitating their cooking.

By the utilization of methyl cellulose solution, the extrusion process can be applied to practically any food product or mixture which is to be cooked as it issues from the extrusion orifice, as well as to products which after extrusion are to be temporarily preserved prior to cooking, either by freezing or drying. The process can be applied to starchy materials of all kinds, to improve the processing procedure, and to various other types of foods including vegetables, meats, fish, fruits, edible solutions or dispersions, as well as to mixtures of these types of foods with each other with or without addition of starchy materials. It will be seen that the process has wide advantages over the conventional process wherein only a few varieties of pretreated corn or gelatinized starchy materials can be used.

While the invention is particularly exemplified with methyl cellulose, it will be understood that any edible hydrophilic colloid which will provide a viscous, slippery fluid at room temperature but in contact with higher temperatures will almost instantaneously form a gel or film, might be used in place thereof. Also, it will be understood that the term "methyl cellulose" as used herein is intended to include certain derivatives of methyl cellulose which have generally the same properties. Hydroxypropyl methyl cellulose is illustrative of such a derivative. Carboxy methyl cellulose, on the other hand, has entirely different characteristics and is unsuitable for the purposes of the present invention. Further description of suitable methyl cellulose products is found in my aforementioned Patent 2,887,382. Methyl cellulose products as marketed under the trade name "Methocel" have been found satisfactory. These cellulose methyl ethers have characteristics which are found to be extremely useful in the preparation of the new extruded products. They are edible and nontoxic, fluid in solution at room temperature but form a heat-reversible gel, freeze-resisting, easily reconstituted after drying, available in a wide range of different viscosity ranges and types, easily prepared in any degree of viscosity and concentration, and do not adversely affect food flavors or add food value of their own. No additives are required for gelation or film-forming, and the texture imparted to the cooked product is excellent.

The new process consists of:

(1) Preparing a methyl cellulose solution of a desired concentration and viscosity depending upon the texture and strength desired in the final product. The concentration of methyl cellulose in the solution is not sharply critical, but can be varied over a wire range. Methyl cellulose is commercially produced in grades which provide in 2% solution from 15 cps. viscosity to 15,000 cps. and higher. The viscosity is also variable according to the concentration used and types of grades. Therefore, it is very easy for any person skilled in the art to choose the type methyl cellulose most suitable for the desired operation. However, in general, the more highly viscous solutions are employed with food products that have the least natural tendency to adhere together and more highly concentrated solutions are used with food products which are already high in moisture concent.

(2) Mixing the food particles with the methyl cellulose solution in a selected concentration either in a continuous operation or in a batch-type operation. The proportions of food particles to methyl cellulose solution may be varied over a wide range to meet the requirements of a particular food or of a particular trade. If desired, the proportion of solution can be used to provide water in sufficient quantity to reconstitute a natural product, as where a dry vegetable powder is employed. In this instance, from 70% to 90% of solution may be employed with from 30% to 10% of dry powder. On the other hand, much higher proportions of powder may be used. Sufficient moisture is necessary to provide a cooked, not burned, fried product, and therefore lesser quantities of methyl cellulose solution and high concentrations are used where water-rich foods are employed (natural fruits, vegetables, etc.), than where drier products are used (for example, fish, meats, starches and dehydrated food powders). As little as 10% of methyl cellulose solution may be satisfactory in some instances.

(3) Passing the resulting semi-fluid mass through the extrusion machine and extruding the mass directly into the frying bath or cooking bath, depending on what type of product it is desired to obtain. It has been found that extruded pieces have no tendency to stick one to the other while frying or cooking. This is a material advantage over known extrusion processes even where the process is applied to conventional foods. The shape of the product is provided by the extrusion nozzle and is preserved through the cooking. During the cooking, the food particles are held together by gel and consequent film formation and the water content is reduced to the proportion safe for preservation as a dry product, i.e., less than 8% and generally between 3 and 5%.

Alternatively, prior to step 3, the extruded product may be frozen or dried, if temporary preservation is desired, prior to the cooking step. The cooked product may also be preserved by drying or freezing, if desired.

In the proposed new method fruits, or fish, or vegetables, or any combination, is mixed in any desired concentration in the methyl cellulose solution in step 2, and the resulting mixture is ready for the extrusion operation. In preparation of high-moisture content foods, chopping rather than grinding is preferred so as to release at little of the moisture as possible. Where large amounts of natural juices are released or where it is desired to add an edible liquid to solid food particles, such juices or liquids can be employed in making up the methyl cellulose solution in step 1. Alternatively, in cases where food products are used with high water content, to avoid the use of high concentration of Methocel the food products can be partially pre-dried prior to mixture with Methocel solution, or the shredded wet food product can be dried out by adding a tasteless, starchy product, such as potato starch, rich flour, cornstarch, etc.

Further, it has been found that a relatively stable foam can be readily prepared by agitation of "Methocel" solutions or by incorporation of air, carbon dioxide or other inert gases by other means, and that such foam can be utilized in preparing the extruded products whereby when such products are cooked they have a very light, porous texture. The density of the foamed products can be varied by varying the degree of foaming or of incorporation of air, carbon dioxide or other inert gases into the mass from which they are extruded. Additional foaming agents and/or foam stabilizers may be utilized if desired. For example, egg white may be added, the white of one egg to a quart of methyl cellulose solution producing a satisfactory product. The lower viscosity grades of "Methocel" e.g. 15–1000 cps. are preferred for foaming.

It has been found that aqueous methyl cellulose solutions are excellent emulsifiers of oils. Thus, where desired, a small amount of vegetable oil or other edible oil (e.g. 1–2%) may be added to the methyl cellulose solution prior to or during the mixing of the other food ingredients. Mixing and extrusion are thereby facilitated.

The thickness of the extruded product can be controlled both by the amount and concentration of methyl cellulose solution used and by the size of the extrusion nozzle. The greater the amount of methyl cellulose solution in proportion to dry solids the thinner the product, with a given nozzle size. Nozzle size may be varied widely, ⅙", ⅛", or 1/12" x 1½" being illustrative.

The invention is further illustrated by the following examples of practice:

*Example I*

Extruded potato chips of ribbon-like shape are prepared by mixing about 50 parts by weight of potato flour with an equal amount of a previously prepared "Methocel" solution of 2% concentration having a viscosity of 2000 cps. The mixing is conducted at room temperature and is continued until a homogeneous mass is obtained. This mass, which is of a semi-fluid consistency is placed in an extrusion machine having a nozzle dimension of ½" x ⅛". The extruded material is cut into 1" lengths and dropped directly into a bath of hot cooking fat, from which cooked chips are continuously removed. The product is salted to taste and packaged in the usual manner. Its keeping quality is governed only by the keeping quality of cooking oil remaining in the product.

A similar product is prepared by utilizing corn flour.

*Example II*

A product similar to that of Example I but having slightly different texture and different content of starchy material is prepared by mixing from 20 to 25 parts by weight of potato flour with a previously prepared methyl cellulose solution of the same grade and type but having a concentration of 4%, such solution being utilized to provide 75 to 85 parts by weight of the mixture. The product is extruded into hot cooking oil, as before. Other starchy flours can be substituted for the potato flour, as desired.

*Example III*

An oatmeal chip is prepared by mixing about 40% by weight of oatmeal flour with about 60 parts by weight of methyl cellulose solution of 3% concentration and of a viscosity grade of 200 to 4000 cps. The product is readily extruded into the hot bath of cooking oil.

*Example IV*

A whole wheat chip is produced by mixing about 30 parts by weight of whole wheat flour with about 70 parts by weight of a "Methocel" solution of about 4% concentration, the "Methocel" being of a viscosity grade of 4000 cps. The product is extruded into hot cooking fat, as before.

*Example V*

A celery chip is prepared by adding about 100 parts by weight of finely chopped, raw celery to about 90 parts by weight of "Methocel" solution of 4% concentration and of 4000 cps. viscosity grade. About 10 parts by weight of corn starch or other starchy flour is added in order to provide a higher solids-to-liquid ratio. The product, after mixing to secure homogeneity is then in excellent condition for extrusion. It is extruded directly into the hot fat, as before, and provides a tasty, celery-flavored product.

Example V may be carried out with spinach, cabbage, carrots, or any other raw vegetable or fruit. The amount of starch can be varied as desired, depending upon the moisture content of the vegetable or may be omitted entirely if desired.

*Example VI*

Extruded fish chips are prepared as follows:

About 100 parts by weight of ground raw fish are mixed with from 50 to 70 parts by weight (depending upon the kind of fish), of a methyl cellulose solution of 4% concentration, 4000 cps. viscosity grade. After the mixture has become homogeneous, it is extruded, as before, into the hot fat. The texture, flavor and keeping properties of the product are excellent.

*Example VII*

Mixed seafood chips are prepared as follows:

20 parts by weight of shrimp, 10 parts by weight of scallops, 10 parts by weight of clams, and 60 parts by weight of fish, all finely chopped and either raw or partially precooked, are mixed with from 50 to 60 parts by weight of methyl cellulose solution of approximately 4% concentration, 4000 cps. grade. The product, after mixing to secure homogeneity, is extruded into hot fat, as before. The resulting product is highly pleasing to the taste and has excellent keeping qualities. If desired, small amounts of starch or flour can be added to the foregoing mixture as desired.

*Example VIII*

Puffed or foamed products. A Methocel solution of about 2% concentration of a viscosity grade of 100–1000 cps. is mixed in a high-speed mixer to provide a foamy mass. Approximately an equal amount by weight of potato flour is added to such mass and mixing is continued to secure homogeneity. The mass, which still retains a substantial amount of air in the form of small bubbles, is then extruded into the hot fat bath. A light, crispy product of pleasing texture is provided. Other types of starches and other food products can be utilized in place of the potato flour and quantity can be varied as desired.

In any of the foregoing examples, seasonings, flavoring, and coloring matter can be added to suit the individual taste prior to the extrusion operation. Further, in lieu of extruding the product directly into the hot fat, it may be extruded onto a tray or moving conveyor belt or the like, conducted to a drying or freezing chamber and packaged for cooking at a later stage. It will be understood that the width and thickness of the chips may be varied as desired, by varying the dimensions of the extrusion nozzle. Likewise, the product can be cut to any desired length as it issues from such nozzle.

The width and thickness of the chips may be also varied by the quantity of Methocel added—because the more moisture the product has prior to cooling—the smaller it will be after cooking in deep fat.

Further, it has been found that water soluble spices, for example, salt, sugar, etc., once incorporated in a methyl cellulose solution remain in such solution if the methyl cellulose solution has been quickly transformed into a gel by contact with heat without substantial escape into the cooking medium. Thus, a sweet or salty methyl cellulose solution when dropped into hot or boiling water, or other hot cooking medium, almost instantaneously forms a gel with practically no loss of sugar or salt even though left immersed in the hot liquid for a considerable time. A prolonged osmosis process is necessary to extract sugar, salt or other soluble ingredients from a methyl cellulose gel with hot liquids. On the other hand, the cooked product dissolves readily at the temperatures prevailing in the mouth so that the seasoning ingredients give the desired taste to the product.

The characteristic of the gel to hold dissolved components not only contributes to the value of the end products, but is important from an industrial processing standpoint as the cooking baths are not obstructed by saturation with salt, sugar or other food residues. Thus, the cooking bath remains cleaner and does not have to be renewed or filtered as often as in conventional processes. This characteristic is unique in methyl cellulose solutions and distinguishes them from other colloidal solutions which do not form gels on heating. Solutions of carboxy-methyl cellulose, alginates, pectinates, etc., when dropped into hot water or other cooking liquid almost instantaneously dissolve in the hot liquid and saturate the cooking bath unless such solutions are chemically transformed into a gel, a step which is unnecessary with methyl cellulose.

I claim:

1. The method of preparing an extruded food product of light porous structure, comprising preparing a foam of methyl cellulose solution, incorporating food particles homogeneously in said foam, extruding the resulting foamy mass into relatively small pieces, and cooking said extruded pieces while said pieces still retain their foam structure.

2. The method of claim 1 wherein said food particles comprise potato particles.

3. The method of claim 1 wherein an additional foaming agent is incorporated in said methyl cellulose solution.

References Cited in the file of this patent

UNITED STATES PATENTS

| | | |
|---|---|---|
| 2,791,508 | Rivoche | May 7, 1957 |
| 2,798,814 | Rivoche | July 9, 1957 |
| 2,887,382 | Rivoche | May 19, 1959 |

UNITED STATES PATENT OFFICE
CERTIFICATE OF CORRECTION

Patent No. 3,114,639                              December 17, 1963

Eugene J. Rivoche

It is hereby certified that error appears in the above numbered patent requiring correction and that the said Letters Patent should read as corrected below.

Column 4, line 5, for "rich" read -- rice --.

Signed and sealed this 5th day of May 1964.

(SEAL)
Attest:
ERNEST W. SWIDER                            EDWARD J. BRENNER

Attesting Officer                                 Commissioner of Patents